(12) United States Patent
Miyata et al.

(10) Patent No.: US 11,051,110 B2
(45) Date of Patent: Jun. 29, 2021

(54) SOUND GENERATOR

(71) Applicant: DENSO ELECTRONICS CORPORATION, Anjo (JP)

(72) Inventors: Susumu Miyata, Anjo (JP); Koshiro Hayakawa, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 69 days.

(21) Appl. No.: 16/448,008

(22) Filed: Jun. 21, 2019

(65) Prior Publication Data

US 2019/0313192 A1 Oct. 10, 2019

Related U.S. Application Data

(63) Continuation of application No. PCT/JP2017/032754, filed on Sep. 12, 2017.

(30) Foreign Application Priority Data

Jan. 26, 2017 (JP) .............................. JP2017-012356

(51) Int. Cl.
| | |
|---|---|
| *H04R 7/12* | (2006.01) |
| *H04R 7/18* | (2006.01) |
| *H04R 9/02* | (2006.01) |
| *H04R 9/04* | (2006.01) |
| *H04R 9/06* | (2006.01) |
| *H04R 1/00* | (2006.01) |
| *H04R 1/02* | (2006.01) |
| *B60Q 5/00* | (2006.01) |

(52) U.S. Cl.
CPC ................. *H04R 7/12* (2013.01); *H04R 1/00* (2013.01); *H04R 1/02* (2013.01); *H04R 7/18* (2013.01); *H04R 9/025* (2013.01); *H04R 9/04* (2013.01); *H04R 9/06* (2013.01); *B60Q 5/00* (2013.01); *H04R 2400/11* (2013.01)

(58) Field of Classification Search
CPC combination set(s) only.
See application file for complete search history.

(56) References Cited

U.S. PATENT DOCUMENTS

| 3,230,319 A | * | 1/1966 | Kliewer | .................. H04R 9/10 |
| | | | | 381/432 |
| RE26,030 E | * | 5/1966 | Miyata | ..................... H04R 9/00 |
| | | | | 381/400 |

(Continued)

FOREIGN PATENT DOCUMENTS

| JP | 2004179698 A | 6/2004 |
| JP | 2016025558 A | 2/2016 |

*Primary Examiner* — Fan S Tsang
*Assistant Examiner* — Angelica M McKinney
(74) *Attorney, Agent, or Firm* — Harness, Dickey & Pierce, P.L.C.

(57) ABSTRACT

A sound generator that generates sound by vibrating a diaphragm includes: a housing including a first space opened to the atmosphere by a sound emission hole and a second space separated from the first space by the diaphragm; and a shield plate disposed in the first space to face the diaphragm while being separated from the diaphragm. When the diaphragm is displaced toward the first space by a pressure difference between the first space and the second space, the diaphragm comes in contact with the shield plate to limit deformation of the diaphragm.

15 Claims, 7 Drawing Sheets

(56) References Cited

U.S. PATENT DOCUMENTS

| | | | | |
|---|---|---|---|---|
| 4,790,020 A | * | 12/1988 | Lin | G10K 11/025 |
| | | | | 181/185 |
| 2012/0266590 A1 | * | 10/2012 | Janes | F15B 1/24 |
| | | | | 60/413 |
| 2013/0001842 A1 | * | 1/2013 | Kanaya | F16F 13/106 |
| | | | | 267/140.13 |
| 2015/0164690 A1 | * | 6/2015 | Peterson | A61F 9/00736 |
| | | | | 604/67 |
| 2017/0134847 A1 | * | 5/2017 | Miyata | H04R 1/2842 |
| 2018/0081406 A1 | * | 3/2018 | Kita | H04R 11/02 |
| 2019/0298231 A1 | * | 10/2019 | Grant | F04B 39/1066 |

\* cited by examiner

FIG. 9 ness inspection is performed to ensure a waterproofing and a sealing performance of the sound generator. In the airtightness inspection, there is a need to press the diaphragm with a jig or the like in order to prevent inversion of the diaphragm by an air pressure or the like and stabilize the inspection result.

SOUND GENERATOR

CROSS REFERENCE TO RELATED APPLICATIONS

The present application is a continuation application of International Patent Application No. PCT/JP2017/032754 filed on Sep. 12, 2017, which designated the United States and claims the benefit of priority from Japanese Patent Application No. 2017-012356 filed on Jan. 26, 2017. The entire disclosures of all of the above applications are incorporated herein by reference.

TECHNICAL FIELD

The present disclosure relates to a sound generator.

BACKGROUND ART

A sound generator is used for a vehicle alarm or a vehicle approach notification device.

SUMMARY

According to an aspect of the present disclosure, a sound generator that generates sound by vibrating a diaphragm includes: a housing including a first space opened to the atmosphere by a sound emission hole and a second space separated from the first space by the diaphragm; and a shield plate disposed in the first space to face the diaphragm while being separated from the diaphragm. When the diaphragm is displaced toward the first space by a pressure difference between the first space and the second space, the diaphragm comes in contact with the shield plate to limit deformation of the diaphragm.

DESCRIPTION OF EMBODIMENTS

A sound generator is used for a vehicle alarm or a vehicle approach notification device. In the sound generator, a shield plate is installed in front of a diaphragm inside a base housing for the purpose of achieving both an acoustic performance and a function of preventing water or snow from entering.

The sound generator is a sealed product, and an airtightness inspection is performed to ensure a waterproofing and a sealing performance of the sound generator. In the airtightness inspection, there is a need to press the diaphragm with a jig or the like in order to prevent inversion of the diaphragm by an air pressure or the like and stabilize the inspection result.

However, in case where the shield plate is installed in front of the diaphragm inside the base housing, there is a need to remove the shield plate in order to hold the diaphragm using the jig, which leads to an increase in the number of parts and an increase in the cost of the mold.

The present disclosure provides a sound generator capable of performing an airtightness inspection without using a jig for holding a diaphragm.

According to an aspect of the present disclosure, a sound generator that generates sound by vibrating a diaphragm includes: a housing including a first space opened to the atmosphere by a sound emission hole and a second space separated from the first space by the diaphragm; and a shield plate disposed in the first space to face the diaphragm while being separated from the diaphragm. When the diaphragm is displaced toward the first space by a pressure difference between the first space and the second space, the diaphragm comes in contact with the shield plate to limit deformation of the diaphragm.

According to the above configuration, the deformation of the diaphragm is limited by a contact between the diaphragm and the shield plate, and the shield plate becomes a substitute for a jig that presses the diaphragm. Therefore, the airtightness inspection can be performed without the use of a jig that presses the diaphragm.

The sound generator may further include a drive unit that vibrates the diaphragm. A distance between the diaphragm and a contact surface of the shield plate in contact with the diaphragm is greater than an amount of displacement of the diaphragm when the diaphragm is vibrated by the drive unit.

According to the configuration described above, the contact between the diaphragm and the shield plate due to the sound generating operation can be inhibited.

The drive unit may include: a cylindrical core portion of the diaphragm that stands upright toward the second space; a voice coil wound around the core portion; and a magnetic circuit unit in which a cylindrical space coaxial with the core portion is provided inside. The magnetic circuit unit displaces the core portion inside the cylindrical space by applying a magnetic field to the voice coil. The amount of displacement of the diaphragm when the diaphragm is vibrated by the drive unit is defined within a range in which the core portion is maintained to be in the cylindrical space.

The amount of displacement of the diaphragm is defined by, for example, the range in which the core portion is maintained to fit in the space in this manner, and the distance between the diaphragm and the shield plate is set to be larger than the amount of displacement, thereby being capable of inhibiting the contact between the diaphragm and the shield plate due to the sound generation operation.

The distance between the diaphragm and the contact surface of the shield plate which comes in contact with the diaphragm may be set within a range between 1 mm and 6 mm.

When the distance between the shield plate and the diaphragm is set between 1 mm and 6 mm in this manner, the contact between the diaphragm and the shield plate due to the sound generation operation can be inhibited.

An outer edge of the inner peripheral portion of the diaphragm comes in contact with an outer edge of the inner peripheral portion of the shield plate to limit the deformation of the diaphragm, and when the deformation of the diaphragm is limited by the shield plate, a gap is provided between the inner peripheral portion of the diaphragm and the inner peripheral portion of the shield plate.

Although the inner peripheral portion of the diaphragm has a low strength, the inner peripheral portion of the diaphragm and the inner peripheral portion of the shield plate are brought in contact with each other at the outer edge, and the gap is provided between the diaphragm and the shield plate, thereby being capable of reducing the deformation or breakage of the diaphragm.

In addition, the diaphragm may include an upright portion projected from the outer edge of the inner peripheral portion toward the second space. When the deformation of the diaphragm is limited by the shield plate, the diaphragm comes in contact with the shield plate at the portion where the upright portion is formed.

In this manner, the diaphragm comes in contact with the shield plate at the portion where the upright portion is formed to raise the strength, thereby being capable of reducing the deformation or breakage of the diaphragm.

Hereinafter, embodiments will be described according to the drawings. Same or equivalent portions among respective embodiments below are labeled with same reference numerals in the drawings.

First Embodiment

A first embodiment will be described with reference to FIGS. 1 to 8. A sound generator according to the present embodiment is installed, for example, outside a vehicle cabin, and is used to generate a warning sound. As shown in FIG. 2, the sound generator includes a housing 1 in which two spaces are provided.

Figure 1:
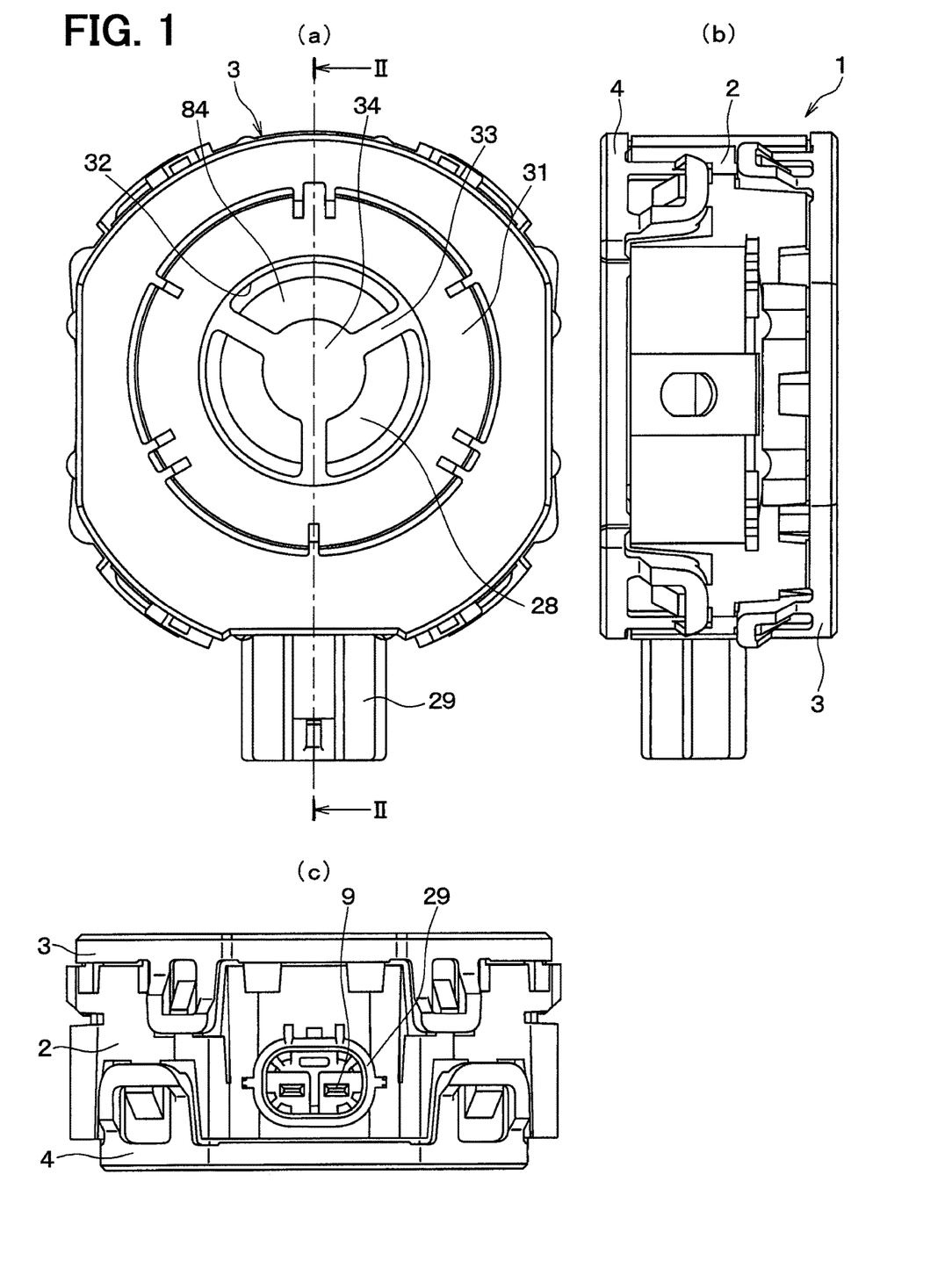
FIG. 1 is a diagram showing an overall configuration of a sound generator according to a first embodiment, in which (a) is a front view, (b) is a left side view, and (c) is a bottom view.
Figure 2:
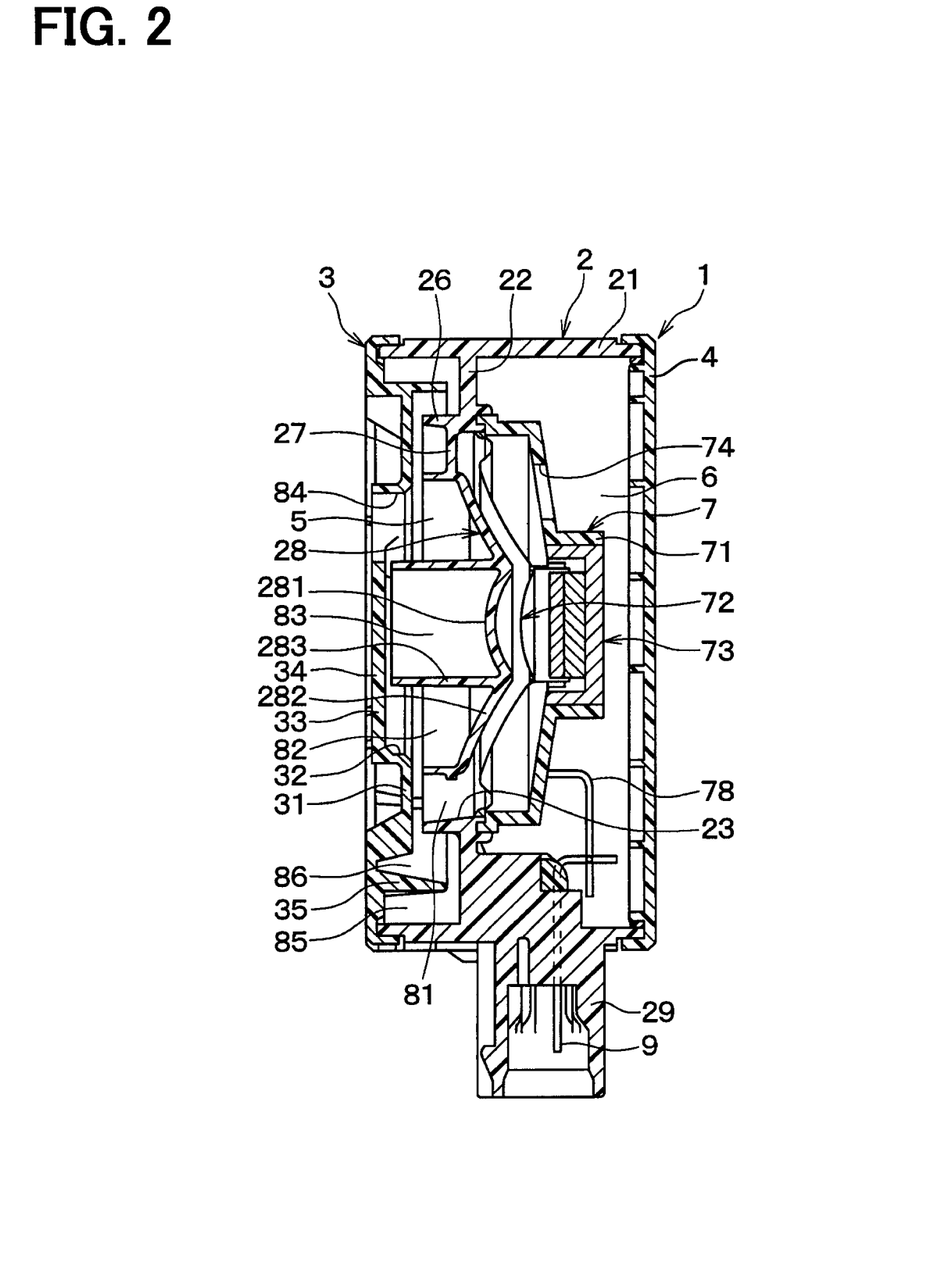
FIG. 2 is a cross-sectional view taken along a line II-II of (a) in FIG. 1.

More specifically, as shown in FIGS. 1 and 2, the housing 1 includes a base 2, a cover 3, and a case 4, which are made of resin. The base 2 includes a base cylinder portion 21 having a substantially cylindrical shape. The disk-shaped cover 3 is fitted to an opening on one end side of the base cylinder portion 21 so as to cover the opening. The disk-shaped case 4 is hermetically bonded to the opening on the other end side of the base cylinder portion 21 by adhesion.

As shown in FIG. 2, a space in the base cylinder portion 21 is divided into two spaces in an axial direction by a partition wall 22 provided in the base cylinder portion 21. A first space 5 is provided by the base cylinder portion 21, the partition wall 22, and the cover 3, and a second space 6 is provided by the base cylinder portion 21, the partition wall 22, and the case 4.

Figure 4:
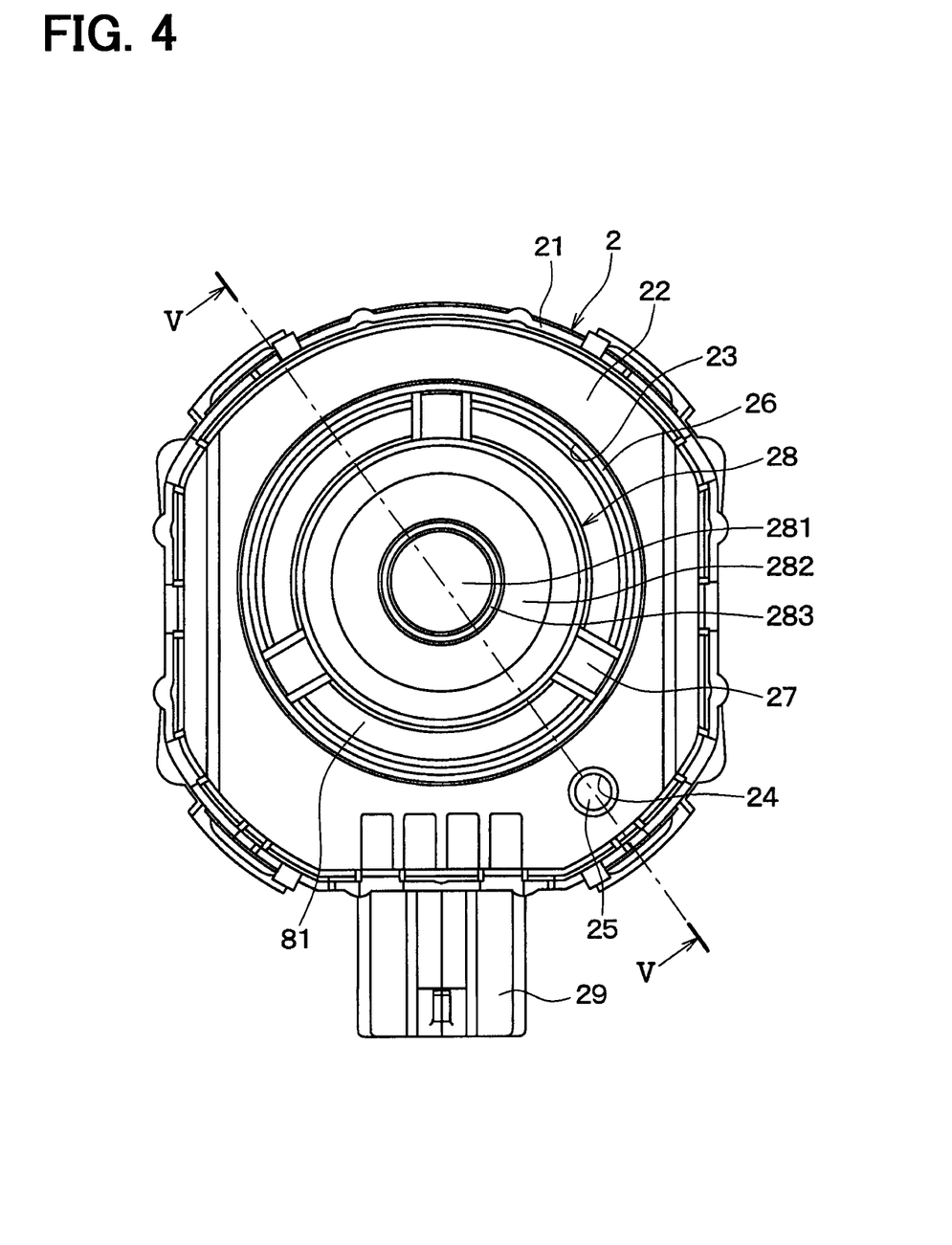
FIG. 4 is a front view of the sound generator of FIG. 1 with a cover removed.

As shown in FIGS. 2 and 4, the partition wall 22 has a circular through hole 23 for communicating the first space 5 with the second space 6. As shown in FIG. 2, a sounding body 7 for generating a sound based on an electric signal is disposed in the second space 6 so as to close the through hole 23. As will be described later, the through hole 23 is closed by the diaphragm 72 of the sounding body 7, and the second space 6 is separated from the first space 5 by the diaphragm 72.

Figure 5:
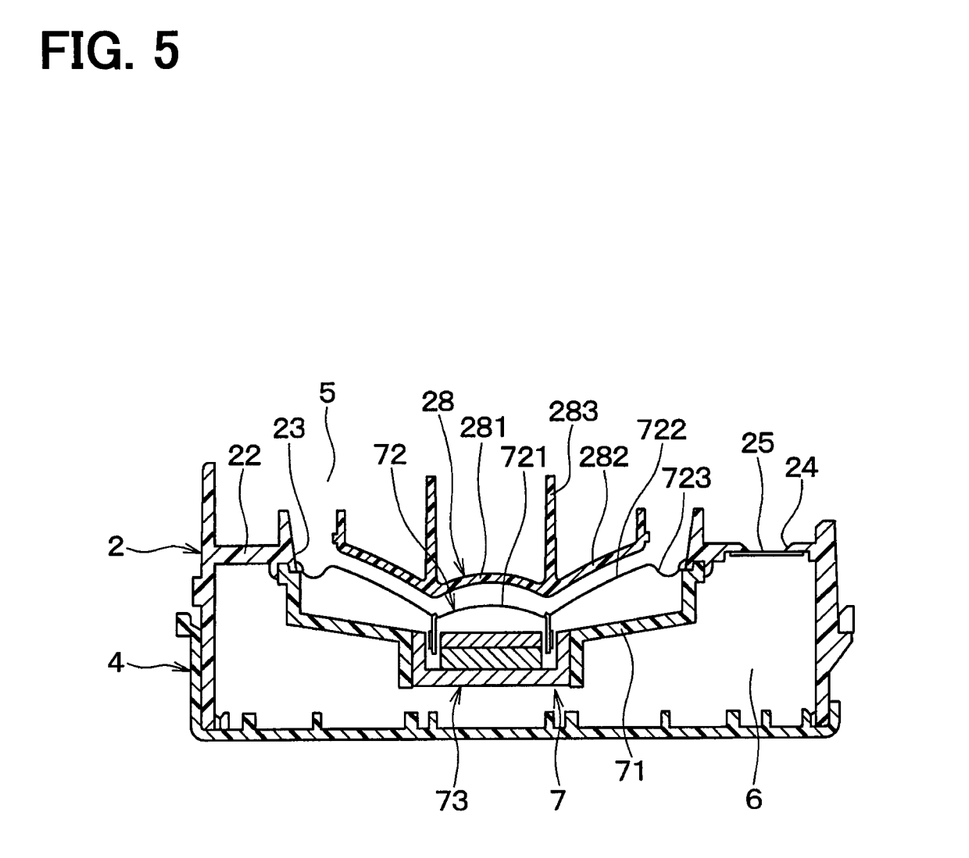
FIG. 5 is a cross-sectional view taken along a line V-V of FIG. 4.

As shown in FIGS. 4 and 5, a vent hole 24 is provided in the partition wall 22 at a position apart from the through hole 23. The vent hole 24 is provided for reducing the occurrence of a pressure difference between the first space 5 and the second space 6 due to a temperature change. A ventilation film 25 is stretched over the vent hole 24. The ventilation film 25 blocks water while air passes through the ventilation film 25, and is made of, for example, Goretex®.

As shown in FIGS. 2 and 4, a shield cylinder portion 26 is connected to an open end of the partition wall 22. The shield cylinder portion 26 has a cylindrical shape that surrounds the through hole 23 and projects from the partition wall 22 toward the cover 3. A beam-shaped coupling portion 27 is connected to a part of the shield cylinder portion 26 closer to the partition wall 22 than the opening end surface adjacent to the cover 3. The coupling portion 27 extends from the shield cylinder portion 26 toward a radially inner side of the through hole 23, and the shield cylinder portion 26 is connected to a shield plate 28 through the coupling portion 27.

The shield plate 28 is provided for inhibiting a flow of water during a high-pressure washing and snow adhering to a surface of the cover 3 from reaching the sounding body 7 and for preventing the sounding body 7 from being damaged by the adhesion of water. The shield plate 28 is disposed between a sound emission hole 84 and the diaphragm 72, which will be described later, inside the housing 1.

When the diaphragm 72 is displaced during an airtightness inspection, the shield plate 28 contacts the diaphragm 72 and restricts the deformation of the diaphragm 72. As shown in FIGS. 2 and 5, the shield plate 28 is disposed in the first space 5 in a state of being separated from the diaphragm 72 so as to face the diaphragm 72, and has a shape corresponding to the diaphragm 72.

Specifically, an inner peripheral portion 281 of the shield plate 28 has a dome shape which is convex toward an opposite side of the diaphragm 72. An outer peripheral portion 282 is inclined to the opposite side of the diaphragm 72. Specifically, the outer peripheral portion 282 has a hollow truncated cone shape extending from an outer edge of the inner peripheral portion 281 toward the first space 5, and is curved so that a cross section of the outer peripheral portion 282 along the radial direction is convex toward the inner side in the radial direction. The inner peripheral portion 281 and the outer peripheral portion 282 face respectively an inner peripheral portion 721 and an outer peripheral portion 722 of the diaphragm 72, which will be described later.

According to the present embodiment, the shield plate 28 contacts the diaphragm 72 at an outer edge of the inner peripheral portion 281 and the outer peripheral portion 282. The outer peripheral portion 282 has a shape corresponding to the outer peripheral portion 722 when the diaphragm 72 is deformed, thereby inhibiting breakage of the diaphragm 72.

The inner peripheral portion 281 is located closer to the case 4 than the partition wall 22 in the axial direction of the base cylinder portion 21, and the outer peripheral portion 282 is disposed so as to pass through the through hole 23. The end portion of the outer peripheral portion 282 on the opposite side to the inner peripheral portion 281 has a cylindrical shape projecting toward the cover 3. As shown in FIG. 2, the outer peripheral portion 282 is connected to the coupling portion 27 at the end portion of the cylindrical shape.

As shown in FIG. 4, according to the present embodiment, multiple coupling portions 27 are formed. Multiple sound passages 81 are defined by the shield cylinder portion 26, the multiple coupling portions 27, and the shield plate 28, and the sound generated by the sounding body 7 passes through the sound passages 81.

The shield plate 28 has a cylindrical portion 283 protruding from the outer edge of the inner peripheral portion 281 toward the cover 3. As shown in FIG. 2, a resonance chamber 82 is defined by the outer peripheral portion 282, the cylindrical portion 283, and the cover 3, and a resonance chamber 83 is defined by the inner peripheral portion 281, the cylindrical portion 283, and the cover 3. A sound pressure of the sound generated by the sounding body 7 is amplified by the resonance chamber 82 and the resonance chamber 83.

As shown in FIGS. 1, 2, and 4, a connector 29 having a substantially rectangular cylindrical shape for electrically connecting the sounding body 7 to an external harness (not shown) is formed on the outer side of the base cylinder portion 21. As shown in FIG. 2, a portion of the base cylinder portion 21 where the connector 29 is formed has a through hole passing through the base cylinder portion 21 to connect the inside of the connector 29 and the second space 6. A terminal 9 is disposed so as to pass through the through hole.

The terminal 9 is fixed to the base cylinder portion 21 by an adhesive inside the base cylinder portion 21, and the through hole provided for disposing the terminal 9 is closed by the adhesive and the terminal 9. The terminal 9 is connected to a lead pin 78, which will be described later, in the second space 6.

As shown in FIGS. 1 and 2, the cover 3 has a disk shape corresponding to the base cylinder portion 21. A protrusion portion 31 protruding toward the inside of the housing 1 is formed in a portion of the cover 3 facing the coupling portion 27 and the sound passage 81. A circular through hole 32 for emitting the sound generated by the sounding body 7 to the outside is provided in a portion of the cover 3 inside the protrusion portion 31. A beam-shaped coupling portion 33 is connected to an open end portion of the through hole 32.

The coupling portion 33 extends to the radially inner side of the through hole 32 and is connected to the shield plate 34. The shield plate 34 has a disk shape and is disposed so as to cover the cylindrical portion 283 of the shield plate 28.

As shown in FIG. 1, according to the present embodiment, the multiple coupling portions 33 are formed, and multiple sound emission holes 84 are provided by dividing the through hole 32 by the multiple coupling portions 33. The sound emission holes 84 open the first space 5 to the atmosphere, and emit the sound generated by the sounding body 7 to the outside.

As shown in FIG. 2, a portion of the cover 3 which is located in the radially outer side than the protrusion portion 31 has a cylindrical portion 35 that protrudes toward the partition wall 22. The cylindrical portion 35 is disposed in a portion of the first space 5 corresponding to the partition wall 22, and a tip of the cylindrical portion 35 is disposed in a portion surrounded by the base cylinder portion 21, the partition wall 22, and the shield cylinder portion 26.

As a result, a resonance chamber for amplifying the sound pressure of the sound generated by the sounding body 7 is provided. Specifically, a resonance chamber 85 is formed by the base cylinder portion 21, the partition wall 22, the outer peripheral portion of the cover 3, and the cylindrical portion 35. A resonance chamber 86 is formed by the partition wall 22, the shield cylinder portion 26, the outer peripheral portion of the cover 3, the protrusion portion 31, and the cylindrical portion 35. A part of the protrusion portion 31 protrudes toward the radially outer side, and is connected to the cylindrical portion 35.

As described above, the first space 5 is provided with the resonance chambers 82, 83, 85, and 86 for amplifying the sound pressure of the sound generated by the sounding body 7. With the formation of the multiple resonance chambers as described above, a large sound pressure can be obtained in a wide frequency band.

Figure 3:
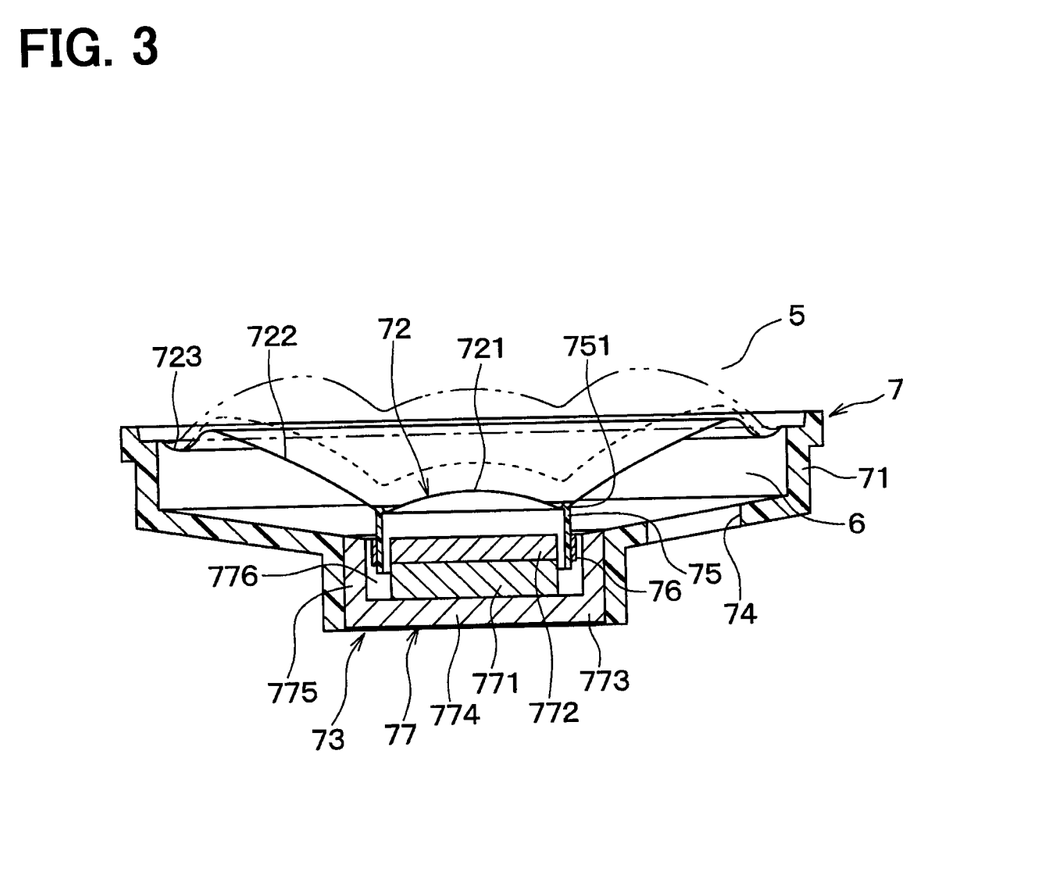
FIG. 3 is an enlarged view of a sounding body of FIG. 2.

As shown in FIGS. 2 and 3, the sounding body 7 includes a substantially stepped cylindrical frame 71, a diaphragm 72, and a drive unit 73 that vibrates the diaphragm 72. The frame 71 is open at both end portions in the axial direction, and one of the two openings of the frame 71 having a larger opening width is closed by the diaphragm 72.

The frame 71 is hermetically bonded to the partition wall 22 by adhesion at the end portion on the side where the opening is closed by the diaphragm 72. The frame 71 has a through hole 74 for communicating between the inside and the outside of the frame 71, and a part of the second space 6 is defined by the space inside the frame 71. In other words, the second space 6 is separated from the first space 5 by the partition wall 22 and the diaphragm 72.

As shown in FIGS. 3 and 5, the inner peripheral portion 721 of the diaphragm 72 has a dome shape which is convex toward the first space 5. The outer peripheral portion 722 of the diaphragm 72 is inclined toward the first space 5. Specifically, the outer peripheral portion 722 has a hollow truncated cone shape extending from the outer edge of the inner peripheral portion 721 toward the first space 5, and is curved such that a cross section along the radial direction is convex toward the inner side in the radial direction.

The inner peripheral portion 721 and the outer peripheral portion 722 respectively face the inner peripheral portion 281 and the outer peripheral portion 282 of the shield plate 28. The outer edges of the inner peripheral portion 721 and the inner peripheral portion 281 have the same shape. Specifically, the outer edge of the inner peripheral portion 721 has a circular shape, and the outer edge of the inner peripheral portion 281 has a circular shape having the same diameter as the outer edge of the inner peripheral portion 721.

Figure 6:
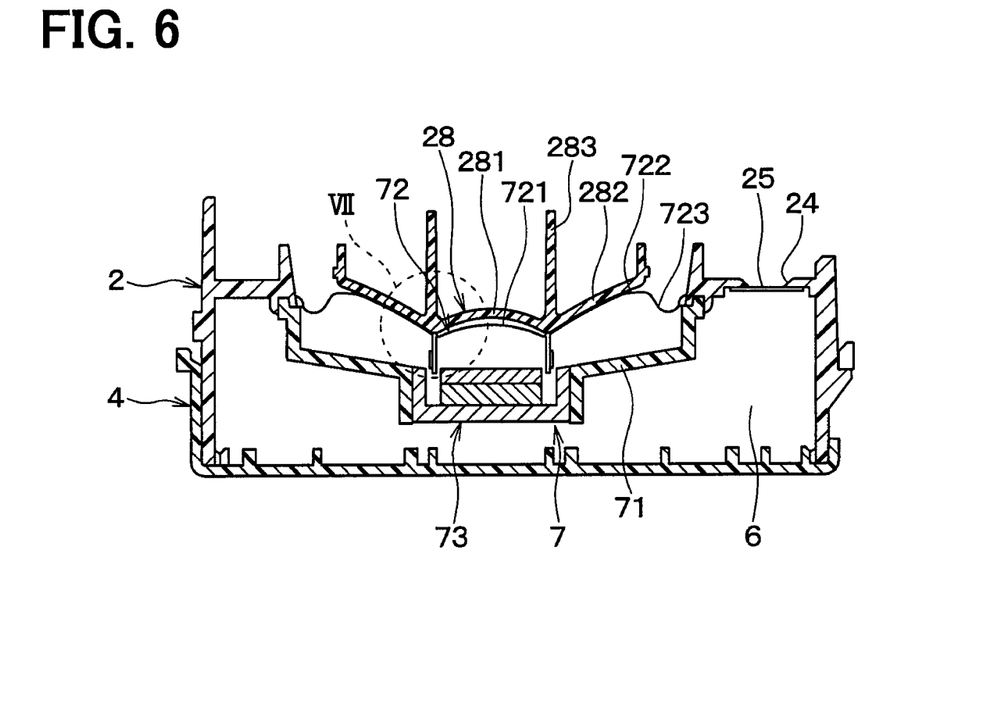
FIG. 6 is a cross-sectional view taken along a line V-V of FIG. 4.
Figure 7:
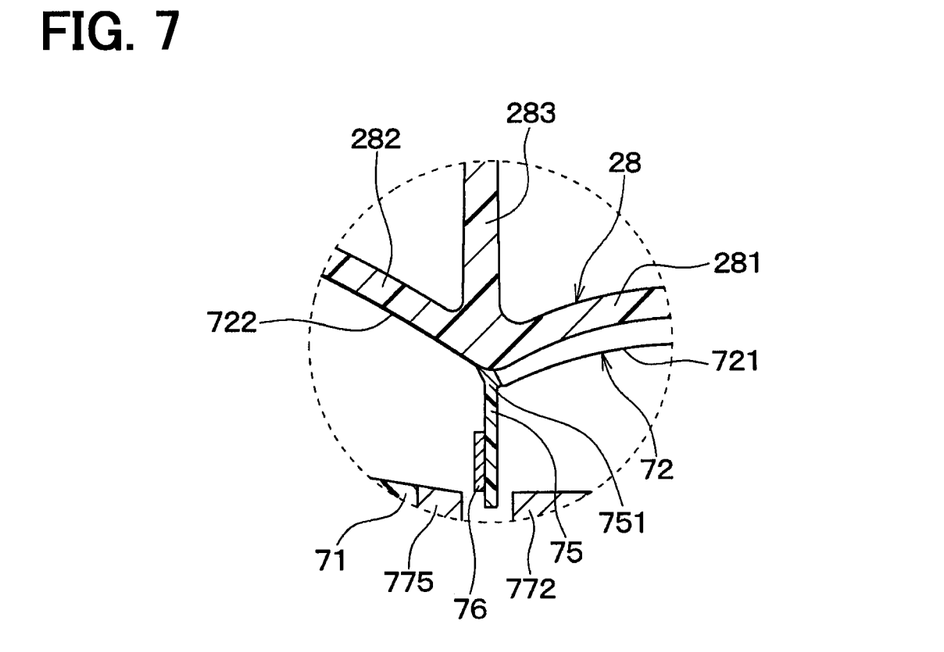
FIG. 7 is an enlarged view of a part VII of FIG. 6.

As will be described later, at the time of airtightness inspection of the sound generator, the inner peripheral portion 721 is displaced toward the first space 5. The diaphragm 72 is deformed so as to expand toward the first space 5, and contacts the shield plate 28. Specifically, as shown in FIGS. 6 and 7, the outer peripheral portion 722 contacts the outer peripheral portion 282.

As described above, according to the present embodiment, the outer edges of the inner peripheral portion 721 and the inner peripheral portion 281 have the same shape. When the diaphragm 72 is deformed as described above, the diaphragm 72 and the shield plate 28 are disposed so that the outer edge of the inner peripheral portion 721 contacts the outer edge of the inner peripheral portion 281.

In the present embodiment, when the diaphragm 72 is deformed as described above, the inner peripheral portion 281 has a higher curvature than that of the inner peripheral portion 721 so that a clearance is defined between the inner peripheral portion 721 and the inner peripheral portion 281.

As will be described later, in the sounding body 7, a sound is generated by vibration of the diaphragm 72. In order to generate a sound having a sufficiently high sound pressure, there is a need to increase a distance between the diaphragm 72 and the shield plate 28 to some extent. Further, a distance between a surface of the diaphragm 72 which contacts the shield plate 28 and a surface of the shield plate 28 which contacts the diaphragm 72 is set to be larger than the amount of displacement of the diaphragm 72 by the sound generating operation so that the diaphragm 72 does not contact the shield plate 28 by the sound generating operation.

For example, it is preferable that the distance between the surface of the diaphragm 72 which contacts the shield plate 28 and the surface of the shield plate 28 which contacts the diaphragm 72 is set within a range between 1 mm and 6 mm.

In the present embodiment, the distance between the outer peripheral portion 282 and the outer peripheral portion 722 is set to 2 mm.

Figure 8:
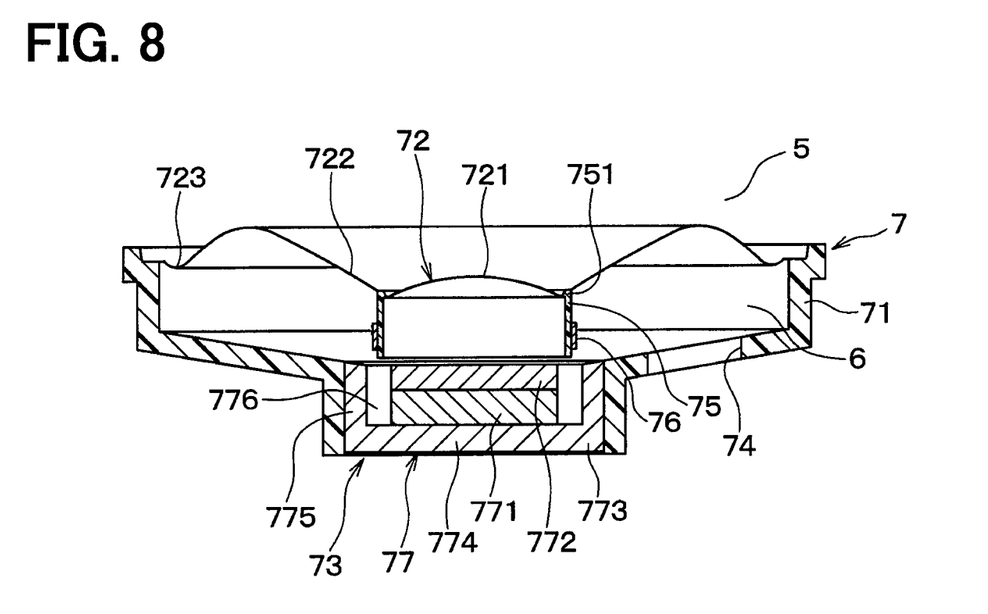
FIG. 8 is an enlarged view of the sounding body in FIG. 2.

The distance between the surface of the diaphragm 72 which contacts the shield plate 28 and the surface of the shield plate 28 which contacts the diaphragm 72 is preferably set so that a bobbin 75, which will be described later, is maintained to be located in a space 776 when the diaphragm 72 is displaced during the airtightness inspection. This is because the bobbin 75 needs to return to an original position in the space 776 due to the displacement of the diaphragm 72 after the airtightness inspection. For example, the axial dimension of the bobbin 75 and the thickness of the top plate 772 to be described later are adjusted so that the state in which the bobbin 75 is located in the space 776 is maintained. However, when the bobbin 75 can return to the original position by a restoring force of the diaphragm 72, as shown in FIG. 8, the bobbin 75 may be moved out of the space 776 by the displacement of the diaphragm 72 in the airtightness inspection.

In the present embodiment, the inner peripheral portion 281 is located closer to the case 4 than the partition wall 22 in the axial direction of the base cylinder portion 21, and the outer peripheral portion 282 is disposed so as to pass through the through hole 23. As a result, when the deformation of the diaphragm 72 is limited by the contact between the shield plate 28 and the diaphragm 72, the diaphragm 72 is displaced without inversion, as indicated by a broken line in FIG. 3.

In other words, when the diaphragm 72 comes into contact with the shield plate 28, the inner peripheral portion 721 is closer to the original position of the inner peripheral portion 721 than the end portion of the diaphragm 72 fixed to the frame 71 in the axial direction of the frame 71. More specifically, when the end portion of the bobbin 75, which will be described later, connected to the diaphragm 72 is defined as an end portion 751, the end portion 751 is closer to the original position of the end portion 751 in the axial direction of the bobbin 75 than the portion of the diaphragm 72 fixed to the frame 71. A one-dot chain line in FIG. 3 indicates a position of the diaphragm 72 fixed to the frame 71. The inversion state of the diaphragm 72 is shown by a two-dot chain line in FIG. 3, that is, the end portion 751 of the bobbin 75 moves beyond the one-dot chain line. When the diaphragm 72 is reversed in this manner, the diaphragm 72 cannot return to the original position by its own restoring force.

A spring portion 723 is connected to the end of the outer peripheral portion 722 away from the inner peripheral portion 721. The spring portion 723 has a ring shape when being viewed from the axial direction of the outer peripheral portion 722. The spring portion 723 has an S-shaped cross section along the radial direction. The diaphragm 72 is bonded to the frame 71 at the end portion of the spring portion 723. In the present embodiment, the inner peripheral portion 721, the outer peripheral portion 722, and the spring portion 723 are formed of a single thin film.

The drive unit 73 is disposed so as to close a narrower opening of the two openings of the frame 71. As shown in FIG. 3, the drive unit 73 includes a bobbin 75, a voice coil 76, and a magnetic circuit unit 77.

The bobbin 75 has a cylindrical shape connected to the outer edge of the inner peripheral portion 721 of the diaphragm 72, and is projected from the diaphragm 72 toward the second space 6. The voice coil 76 is wound around the outer side of the bobbin 75. The bobbin 75 corresponds to an upright portion and a core portion.

The magnetic circuit unit 77 is provided for applying a magnetic field to the voice coil 76. The magnetic circuit unit 77 includes a disk-shaped magnet 771 having one surface and the other surface, a top plate 772 connected to the one surface of the magnet 771, and a yoke 773 connected to the other surface of the magnet 771.

The yoke 773 includes a bottom portion 774, a magnet 771, a top plate 772, and a cylindrical portion 775. The bottom portion 774 has a disk shape, and is connected to the magnet 771. The magnet 771 is located between the bottom portion 774 and the top plate 772. The cylindrical portion 775 protrudes from the outer peripheral portion of the bottom portion 774 toward the diaphragm 72 in the axial direction of the bottom portion 774. The top plate 772 and the yoke 773 are made of a magnetic material such as iron, and correspond to a first magnetic portion and a second magnetic portion, respectively.

The magnet 771 and the top plate 772 are disposed inside the cylindrical portion 775. A cylindrical space 776 is provided between the magnet 771 and the top plate 772, and the cylindrical portion 775. The bobbin 75 is disposed so as to coincide with the space 776 in the axial direction, and is fitted into the space 776.

The magnetic circuit unit 77 is disposed such that the magnet 771, the top plate 772, and the cylindrical portion 775 are located inside the frame 71, and the bottom portion 774 closes the opening of the frame 71. The bobbin 75 is fitted in the space 776. A magnetic field generated between the side surface of the top plate 772 and the side surface of the cylindrical portion 775 is applied to the voice coil 76 wound around the bobbin 75. When a current is applied to the voice coil 76 with the magnetic field applied, the bobbin 75 is displaced axially in a state where the bobbin 75 is fitted into the space 776. As a result, the diaphragm 72 vibrates, and a sound is generated.

The amount of displacement of the diaphragm 72 when the diaphragm is vibrated by the drive unit is defined within a range to maintain the bobbin 75 to be located in the space 776. Specifically, the diaphragm 72 vibrates so that a surface of the top plate 772 adjacent to the diaphragm 72 is maintained between the diaphragm 72 and the end of the bobbin 75 away from the diaphragm 72 in the axial direction of the bobbin 75.

The sounding body 7 includes a lead pin 78 electrically connected to the voice coil 76, and the voice coil 76 is electrically connected to an external harness by press-fitting the lead pin 78 into the terminal 9.

Such a sound generator is disposed in a vehicle exterior, and more specifically, is disposed in a front bumper of the vehicle such that the cover 3 is positioned on the front side of the vehicle with respect to the base 2. When the voice coil 76 is energized, the diaphragm 72 vibrates without contacting the shield plate 28, and a sound is generated. The sound generated by the sounding body 7 passes through a gap defined between the shield plate 28 and the diaphragm 72 and the sound passage 81. The sound pressure is amplified by the resonance chambers 82, 83, 85, and 86, and the sound is emitted to the outside from the sound emission hole 84 or the like.

In the airtightness inspection of the sound generator, a pressure difference is generated between the first space 5 and the second space 6. Specifically, the first space 5 is reduced in pressure in a state in which the vent hole 24 is closed, or the second space 6 is pressurized by feeding an air from the vent hole 24 into the second space 6, so that the pressure of the second space 6 becomes higher than the pressure of the first space 5. As a result, the inner peripheral portion 721 of the diaphragm 72 is displaced toward the first space 5, and the diaphragm 72 is deformed so as to expand toward the first space 5.

At that time, the deformed diaphragm 72 comes into contact with the shield plate 28, thereby limiting the deformation of the diaphragm 72. In other words, the shield plate 28 disposed inside the housing 1 inhibits inversion or deformation of the diaphragm 72 instead of the jig that presses the diaphragm 72. Therefore, the airtightness inspection can be performed without using a jig that presses the diaphragm 72.

In the present embodiment, when the diaphragm 72 is deformed as described above, the outer edge of the inner peripheral portion 721 contacts the outer edge of the inner peripheral portion 281. Since the bobbin 75 is connected to the outer edge of the inner peripheral portion 721 to improve the strength, the breakage of the diaphragm 72 can be restricted when the diaphragm 72 contacts the shield plate 28 at the outer edge of the inner peripheral portion 721.

In the present embodiment, when the diaphragm 72 is deformed as described above, the diaphragm 72 contacts the shield plate 28 at the outer peripheral portion 722 and the outer edge of the inner peripheral portion 721, and a clearance is defined between the inner peripheral portion 721 and the inner peripheral portion 281. Therefore, the breakage of the diaphragm 72 can be inhibited in the inner peripheral portion 721 having a low strength.

Further, in case where the diaphragm 72 is reversed by the displacement of the inner peripheral portion 721 during the airtightness inspection, as indicated by the two-dot chain line in FIG. 3, it becomes difficult for the diaphragm 72 to return to the original shape or position by the own restoring force of the diaphragm 72 when the pressure difference between the first space 5 and the second space 6 decreases.

According to the present embodiment, as described above, the inner peripheral portion 281 is located closer to the case 4 than the partition wall 22 in the axial direction of the base cylinder portion 21, and the outer peripheral portion 282 is disposed so as to pass through the through hole 23. For that reason, the reversal of the diaphragm 72 is inhibited. The diaphragm 72 can return to its original shape or position by the own restoring force of the diaphragm 72 when the pressure difference between the first space 5 and the second space 6 decreases.

Figure 9:
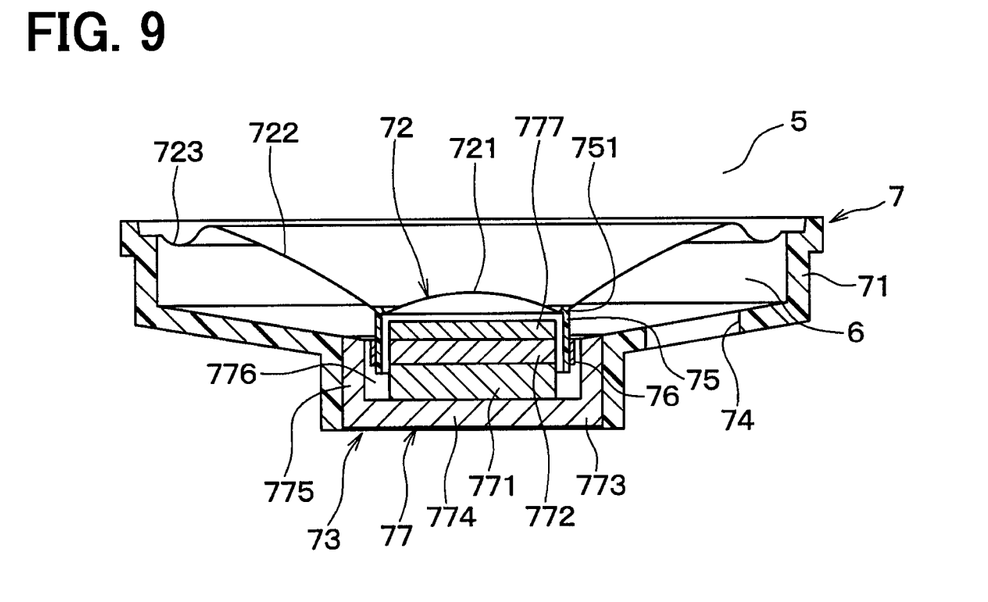
FIG. 9 is an enlarged view of a sounding body in a modification of the first embodiment.

As described above, according to the present embodiment, a state in which the bobbin 75 is located in the space 776 during the airtightness inspection can be maintained with the adjustment of the dimensions of the bobbin 75 or the like. However, such a state may be maintained by other methods. For example, as shown in FIG. 9, a plate 777 made of a non-magnetic material such as aluminum may be stacked on the top plate 772 to maintain the state in which the bobbin 75 is positioned in the space 776.

OTHER EMBODIMENTS

The present disclosure is not limited to the embodiments described above, and can be modified as appropriate within the scope described in the claims.

For example, the inner peripheral portion 721 and the outer peripheral portion 722 may be formed of different members. In addition, a gap may be defined between the outer peripheral portion 722 and the outer peripheral portion 282 when the diaphragm 72 comes into contact with the shield plate 28, for example, by providing a recess portion on the surface of the outer peripheral portion 282 in contact with the outer peripheral portion 722.

The inner peripheral portion 281, the outer peripheral portion 282, the inner peripheral portion 721, and the outer peripheral portion 722 may have shapes different from those of the first embodiment. For example, the inner peripheral portions 281 and 721 may have a cylindrical shape. Further, the inner peripheral portion 281 may have a shape convex toward the second space 6. The cross sections of the outer peripheral portion 282 and the outer peripheral portion 722 along the radial direction may be linear.

What is claimed is:

1. A sound generator that generates sound by vibrating a diaphragm, comprising:
  a housing including a first space opened to an outside air through a sound emission hole and a second space separated from the first space by the diaphragm; and
  a shield plate disposed in the first space to face the diaphragm while being separated from the diaphragm;
  wherein:
  when the diaphragm is displaced toward the first space by a pressure difference between the first space and the second space, the diaphragm comes in contact with the shield plate to limit deformation of the diaphragm;
  the shield plate has a shape corresponding to the diaphragm;
  the diaphragm includes an inner peripheral portion convex toward the first space and an outer peripheral portion inclined from an outer edge of the inner peripheral portion of the diaphragm toward the first space;
  the shield plate includes an inner peripheral portion convex away from the diaphragm and an outer peripheral portion inclined from an outer edge of the inner peripheral portion of the shield plate away from the diaphragm;
  the outer edge of the inner peripheral portion of the diaphragm comes in contact with the outer edge of the inner peripheral portion of the shield plate to limit the deformation of the diaphragm; and
  when the deformation of the diaphragm is limited by the shield plate, a clearance is provided between the inner peripheral portion of the diaphragm and the inner peripheral portion of the shield plate.

2. The sound generator according to claim 1, wherein the outer peripheral portion of the diaphragm comes in contact with the outer peripheral portion of the shield plate to limit the deformation of the diaphragm.

3. The sound generator according to claim 1, wherein the diaphragm includes an upright portion extending upright from the outer edge of the inner peripheral portion toward the second space, and
when the deformation of the diaphragm is limited by the shield plate, the diaphragm comes in contact with the shield plate at a portion where the upright portion is formed.

4. The sound generator according to claim 1, wherein the outer edge of the inner peripheral portion of the shield plate has the same shape as the outer edge of the inner peripheral portion of the diaphragm.

5. The sound generator according to claim 4, wherein the outer edge of the inner peripheral portion of the diaphragm has a circular shape, and
the outer edge of the inner peripheral portion of the shield plate has a circular shape equal in diameter to the outer edge of the inner peripheral portion of the diaphragm.

6. The sound generator according to claim 1, wherein a distance between the diaphragm and a contact surface of the shield plate which comes in contact with the diaphragm is set within a range between 1 mm and 6 mm.

7. The sound generator according to claim 1, further comprising a drive unit that vibrates the diaphragm, wherein
- a distance between the diaphragm and a contact surface of the shield plate in contact with the diaphragm is greater than an amount of displacement of the diaphragm when the diaphragm is vibrated by the drive unit.

8. The sound generator according to claim 7, wherein the drive unit comprises:
- a core portion of the diaphragm having a cylindrical shape projected toward the second space;
- a voice coil that is wound around the core portion; and
- a magnetic circuit unit in which a cylindrical space is defined coaxial with the core portion, to displace the core portion inside the cylindrical space by applying a magnetic field to the voice coil, wherein
- the amount of displacement of the diaphragm, when the diaphragm is vibrated by the drive unit, is defined within a range to maintain the core portion to be located in the cylindrical space.

9. The sound generator according to claim 8, wherein the magnetic circuit unit comprises:
- a magnet having one surface and the other surface;
- a first magnetic portion connected to the one surface of the magnet; and
- a second magnetic portion having
  - a bottom portion connected to the other surface of the magnet, and
  - a cylindrical portion projecting in the axial direction from an outer peripheral portion of the bottom portion, wherein
- the cylindrical space is provided between the magnet and the first magnetic portion, and the cylindrical portion.

10. The sound generator according to claim 8, further comprising
- a frame that secures the diaphragm, wherein
- when the deformation of the diaphragm is limited by a contact between the shield plate and the diaphragm, an end portion of the core portion connected to the diaphragm is closer to an original position of the end portion than a portion of the diaphragm secured to the frame in the axial direction of the core portion.

11. The sound generator according to claim 8, wherein
- when the deformation of the diaphragm is limited by the contact between the diaphragm and the shield plate, the core portion is located out of the cylindrical space, and
- when the pressure difference between the first space and the second space is reduced in a state where the deformation of the diaphragm is limited by the contact between the diaphragm and the shield plate, the diaphragm returns to an original shape or position of the diaphragm by an own restoring force of the diaphragm, and the core portion returns to be located in the cylindrical space by return of the diaphragm to the original shape or position.

12. The sound generator according to claim 1, wherein
- when the pressure difference between the first space and the second space is reduced in a state where the deformation of the diaphragm is limited by the contact between the diaphragm and the shield plate, the diaphragm returns to an original shape or position by an own restoring force of the diaphragm.

13. The sound generator according to claim 1, wherein the outer edge of the inner peripheral portion of the diaphragm is circular in shape.

14. The sound generator according to claim 1, wherein the outer edge of the inner peripheral portion of the shield plate is circular in shape.

15. The sound generator according to claim 1, wherein:
- the outer edge of the inner peripheral portion of the diaphragm is circular in shape;
- the outer edge of the inner peripheral portion of the shield plate is circular in shape; and
- a diameter of the outer edge of the inner peripheral portion of the diaphragm is equal to a diameter of the outer edge of the inner peripheral portion of the shield plate.

\* \* \* \* \*